United States Patent [19]

Johnson

[11] Patent Number: 5,075,344
[45] Date of Patent: Dec. 24, 1991

[54] PROCESS FOR PRODUCING A SUPERABSORBENT POLYMER

[75] Inventor: Thomas C. Johnson, Midland, Mich.

[73] Assignee: The Dow Chemical Company, Midland, Mich.

[21] Appl. No.: 703,076

[22] Filed: May 20, 1991

[51] Int. Cl.$^5$ .............................................. C08J 9/28
[52] U.S. Cl. ..................................... 521/140; 264/25; 521/915; 521/149; 526/240; 526/307.7; 528/481; 528/500; 528/503
[58] Field of Search ...................... 521/140, 149, 915; 264/25; 528/481, 500, 503; 526/240, 307.7

[56] References Cited

U.S. PATENT DOCUMENTS 4,920,202  4/1990  Irie et al. .............................. 528/481

Primary Examiner—Morton Foelak

[57] ABSTRACT

This invention provides an improved process for producing a superabsorbent polymer with reduced residual monomer content which comprises partially drying a crosslinked, partially neutralized polymer gel, then raising the temperature of the gel using microwaves or RF radiation in the absence of circulating air and thereafter completing the drying.

8 Claims, No Drawings

PROCESS FOR PRODUCING A SUPERABSORBENT POLYMER

BACKGROUND OF THE INVENTION

Water-swellable polymers are used as constituents in sanitary materials which absorb body fluids such as: sanitary napkins, incontinent devices and disposable baby diapers. Examples of such polymers are disclosed in U.S. Pat. Nos. 3,926,891; 4,190,562; and 4,293,609, herein incorporated by reference.

Various processes are known for producing absorbent polymers. For example, U.S. Pat. No. 4,833,222, herein incorporated by reference, teaches a process for preparing an absorbent polymer from a neutralized monomer without a surface-active agent. U.S. Pat. No. 4,808,637, herein incorporated by reference, teaches the uniform reaction of acrylic acid, an alkali metal salt of carbonic acid, aluminum acetate, sodium persulfate and water, preferably using microwave radiation as the heat source to initiate polymerization.

A high level of residual monomer of water-soluble polymers is of concern in such materials because the extractable polymers may be leached from the absorbent structure by aqueous fluids. A high level of water-solubles can cause low water-absorbing capacity in the adsorbent device. Thus, when these water-swellable polymers are contacted with catamenial blood, urine, or other body fluids, they have low initial absorption rates, less effective absorption and become sticky. Therefore, a high water-soluble polymer content can inhibit the absorptive capacity of the absorbing device.

U.S. Pat. No. 4,920,202, also incorporated herein by reference, teaches a method for drying a hydrated polymer gel that leads to relatively low residual monomer levels in the dried absorbent polymer. The process requires contacting the gel polymer with a gas containing at least steam and having a dew point in the range of 50° C. to 100° C. at a temperature in the range of 80° C. to 250° C. The use of high dew point air for drying a hydrated polymer gel results in substantially reduced dryer throughput rates. Therefore, it is desirable to provide an improved process for reducing residual monomer content while drying hydrated polymer gels, which process does not require the use of circulating high dew point air.

SUMMARY OF THE INVENTION

The present invention provides an improved process for producing a superabsorbent polymer with reduced residual monomer content which comprises partially drying a crosslinked, partially neutralized polymer gel, then substantially immediately raising the temperature of said gel using microwave or RF radiation in the absence of circulating air and thereafter completing the drying.

By avoiding the use of circulating air improved process economies are observed, i.e., increased production can be obtained while producing products exhibiting excellent gel strengths, high rates of absorption, low levels of residual monomer and water-soluble polymer and high capacities for absorbing and retaining fluids.

DETAILED DESCRIPTION OF THE INVENTION

Suitable water-soluble a,B-ethylenically unsaturated carboxylic acid monomers which are useful in the present invention include those monomers which are capable of conversion by aqueous solution polymerization into a water-swellable and/or lightly crosslinked hydrophilic gel polymer. The crosslinked structure may be obtained by the copolymerization of a water-soluble monomer and a crosslinking monomer possessing at least two polymerizable double bonds in the molecular unit. Examples of such water-soluble monomers include a,B-ethylenically unsaturated monomers such as mono and polycarboxylic acids.

The water-swellable or lightly crosslinked hydrophilic polymers that are prepared by the method of the present invention can be any of the known hydrophilic polymers which are capable of absorbing large quantities of fluids. Examples of such polymers are disclosed in U.S. Pat. Nos. 3,997,484; 3,926,891; 3,935,099; 4,090,013; and 4,190,562, herein incorporated by reference. Such hydrophilic polymers are prepared from water-soluble a,B-ethylenically unsaturated monomers such as mono and polycarboxylic acids and acrylamide and its derivatives.

Examples of suitable monocarboxylic acids include acrylic acid, methacrylic acid, crotonic acid, and isocrotonic acid, alkali metal salts and ammonium salts thereof. Suitable polycarboxylic acids include maleic acid, fumaric acid, and itaconic acid. Suitable acrylamide derivatives include methacrylamide. The preferred monomers include acrylic acid and methacrylic acid and their respective salt forms such as alkali metal or ammonium salts.

It is desirable to obtain a level of conversion of monomer to polymer of at least about 95 percent conversion. The water-soluble monomers useful in the present invention may be used in amounts ranging from about 10 percent to about 80 percent weight based on the total weight of the aqueous monomer solution. Preferably, the amount ranges from about 20 percent to about 60 percent based on the total weight of the aqueous monomer solution.

Optionally, minor amounts of other water-soluble, unsaturated monomers may be present such as alkyl esters of the acid monomers. For example, methyl acrylate or methyl methacrylate may be present.

The polymerization is preferably carried out using carboxylic acid monomers that have been neutralized prior to the polymerization. This neutralization is conveniently achieved by contacting the aqueous monomer with an amount of basic material sufficient to neutralize at least about 50 percent of the acid groups present in the acid monomers. The range is typically from about 20 to about 95 percent, preferably from about 50 percent to about 85 percent, and most preferably up to about 60 percent to about 80 percent of the acid groups present in the acid monomers. When preneutralizing the monomer solution it is important to control the neutralization conditions so that the heat of neutralization does not cause the premature polymerization of the monomer mixture. The neutralization is advantageously carried out at temperatures below about 40° C., preferably below about 35° C.

The use of the pre-neutralized monomer allows for the production of an absorbent polymer which does not need to be neutralized either after polymerization or prior to incorporation into absorbent devices. The polymer prepared from the pre-neutralized monomer is already in the alkali metal salt form. The preneutralized polymers exhibit absorbent properties which are highly desirable for polymers which are to be used as constituents in human fluid absorbent devices.

Conveniently, a conventional vinyl addition polymerization initiator is used in the polymerization of the water-soluble monomers and the crosslinker. A free radical polymerization initiator which is sufficiently soluble in the monomer solution to initiate polymerization is preferred. For example, water soluble peroxides such as potassium persulfate, ammonium persulfate, sodium persulfate, and other alkali-metal persulfates, hydrogen peroxide and water soluble azocompounds such as 2,2'-azobis (2-amidinopropane-HCl). Some of these initiators, such as hydrogen peroxide can be combined with reducing substances such as sulfites or amines to form known redox type initiators. The amount of initiator used may range from about 0.01 to 1.0 weight percent, preferably 0.01 to 0.5 weight percent, based on the total weight of monomer reactants.

Organic compounds having two or more ethylenic groups copolymerizable with the water-soluble monomers can be used as the crosslinking monomers. Exemplary of polyunsaturated crosslinking monomers include diacrylate or dimethacrylate of ethylene glycol, diethylene glycol, triethylene glycol, propylene glycol, 1,4-butane diol, 1,5-pentane diol, 1,6-hexane diol, neopentyl glycol, trimethylol propane and pentaerythritol, triacrylates or trimethacrylates of trimethylol propane and pentaerythritol, tetracylates or tetramethacrylates of pentaerythritol, N,N'-methylene-bis-acrylamide, N,N'-methylene-bis-methacrylamide and triallyl isocyanurate, and the like.

The crosslinking monomer is present in an amount effective to crosslink the water-soluble polymer. Typically, the crosslinking monomer is used in amounts ranging from about 0.0001 to about 5 parts by weight based on 100 parts by weight of water-soluble monomer used. More preferably, the amount ranges from about 0.01 to about 2 parts by weight, and most preferably, from about 0.02 to about 1 part by weight, per 100 parts by weight of the water-soluble monomer. If an amount over 5 parts by weight of crosslinking monomer is used the resulting polymer has too high a crosslinking density and exhibits a reduced absorption capacity, if the crosslinker is used in an amount less than about 0.0001 part by weight the polymer has too low a crosslinking density and when contacted with the fluid to be absorbed becomes sticky and exhibits a lower initial absorption rate. The preferred amount of crosslinking monomer is determined by the desired degree of absorption capacity and the desired strength to retain the absorbed fluid.

Generally, such crosslinking monomers are to a large extent soluble in an aqueous solution of the monomers in acid form as indicated by the clarity of these solutions. However, when the monomer in acid form is neutralized some of the crosslinking monomers tend to exhibit a reduced solubility. This is typically evidenced by the formation of a cloudy solution after the neutralization of the acid monomer solution indicating a phase separation between the crosslinking monomer and the water-soluble monomer. In such cases a dispersing agent may be present in the aqueous solution of the crosslinking monomer and water-soluble monomer in an amount effective to maintain the dispersion of the solution prior to and during the polymerization.

Compounds which are useful to neutralize the carboxylic acid groups of the monomer are typically those which will sufficiently neutralize the acid groups without having a detrimental effect on the polymerization process. Such compounds include alkali metal hydroxides, alkali metal carbonates and bicarbonates. Preferably, the material used to neutralize the monomer is sodium or potassium hydroxide or sodium carbonate or potassium carbonate. The neutralizing agent is used in an amount which will sufficiently neutralize from about 20 percent to about 95 percent, preferably from about 50 percent to about 85 percent, and most preferably from about 60 percent to about 80 percent of the acid groups present in the water-soluble monomer. In determining the desired degree of neutralization care must be taken to insure that the pH of the resulting crosslinked absorbent polymer being contacted with or dispersed in an aqueous fluid to be absorbed is maintained in a range appropriate for the applications for which the polymer is intended.

In a preferred embodiment for making polymers useful in the practice of this invention an aqueous solution of the monomer in the acid form, the crosslinker and the dispersing agent is prepared. The aqueous solution is then neutralized resulting in a dispersion of the crosslinker in a solution of the neutralized acid monomer.

The polymerization of the mixture may be initiated by elevating the temperature of the mixture containing the initiator or by using a redox-type initiator as described above. Generally, the temperature at which polymerization will begin ranges from about 20° C. to about 45° C. The temperature at which the polymerization is carried out is highly dependent on the type of monomers used and the specific initiator system employed. Preferably, the maximum temperature of polymerization ranges from about 50° C. to about 100° C., most preferably from about 60° C. to about 90° C. The method by which the temperature of the polymerization is controlled is not critical so long as sufficient cooling is present to remove the heat which is generated during the polymerization.

After the polymerization step is completed the polymer gel is partially dried in, for example, a circulating air oven, to a moisture content of from 10 to 80 weight percent, preferably 20 to 60 weight percent, expressed on a dry polymer basis. Following the partial drying the polymer gel is substantially immediately subjected to microwave radiation, in the absence of circulating air and in the presence of about 60 to about 300 ppm residual persulfate for a time period of from 2 to 9 minutes, preferably 3 to 6 minutes and advantageously about 4 to 5 minutes after which drying of the polymer is completed with, for example, low dew point circulating air as is known in the art.

Employing these procedures polymer gels containing as little as about 35 ppm and usually about 200 to 300 ppm of residual monomer are readily obtained without the necessity of increasing drying oven capacity or making other costly capital investments. Well known and approved industrial microwave ovens are useful in the present invention. Microwave frequencies of, for example, 915 MHz and 2450 MHz are readily employed as is, for example 27 MHz RF.

The invention is further illustrated by the following examples.

EXAMPLE 1

Two 700 gram samples (A and B) of polymer gel comprising a partially neutralized acrylic acid-trimethylol propane triacrylate copolymer were partially dried and then individually subjected to 375 watts microwave heating for five minutes each. Sample A was in an open container while Sample B was placed in a covered container. The results were as follows:

|  | Original Weight | Weight on Partial Drying | Residual Monomers, ppm |
|---|---|---|---|
| Sample A | 700 grams | 333.8 | 430 |
| Sample B | 700 grams | 333.1 | 260 |

The lower level of residual monomer in Sample B illustrates the improved results obtained when the microwave treatment is carried out in the absence of circulating air.

EXAMPLE 2

A further 700 gram sample of the above polymer gel was subjected to 1070 watts of microwave heating for seven minutes without the initial partial drying. The residual monomer content of the resulting product was 1000 ppm. This example illustrates the necessity for partial drying before subjecting the polymer gel to the microwave treatment.

Various modifications may be made in the present invention without departing from the spirit or scope thereof as will be readily apparent to those skilled in the art.

What is claimed is:

1. Process for producing a superabsorbent polymer with reduced residual monomer content which comprises partially drying by heating by means other than microwave or RF radiation, a crosslinked, partially neutralized acrylic acid polymer gel, having been crosslinked with a polyunsaturated monomer then raising the temperature of said gel using microwave or RF radiation in the absence of circulating air and thereafter completing drying.

2. Process of claim 1 wherein said polymer gel comprises a partially neutralized acrylic acid-trimethylolpropane triacrylate copolymer.

3. Process of claim 1 wherein the said polymer gel is partially dried to a solids content of 10-80 weight percent before applying microwave radiation.

4. Process of claim 3 wherein the said polymer gel is partially dried to a solids content of about 20-60 weight percent before applying microwave radiation.

5. Process of claim 1 wherein the microwave radiation is applied for at least about 4 minutes.

6. Process of claim 1 wherein said gel includes a residual amount of initiator such that said microwave radiation substantially polymerizes residual monomer in said gel.

7. Process of claim 6 wherein said initiator is sodium persulfate.

8. Process of claim 7 wherein said sodium persulfate is present in said partially dried gel in an amount of about 60 to about 300 ppm.

* * * * *